Sept. 21, 1948.  C. M. HATHAWAY  2,449,651
ELECTRONIC CIRCUIT FOR TRIGGERING
STROBOSCOPIC DEVICES
Original Filed June 11, 1942  2 Sheets-Sheet 1
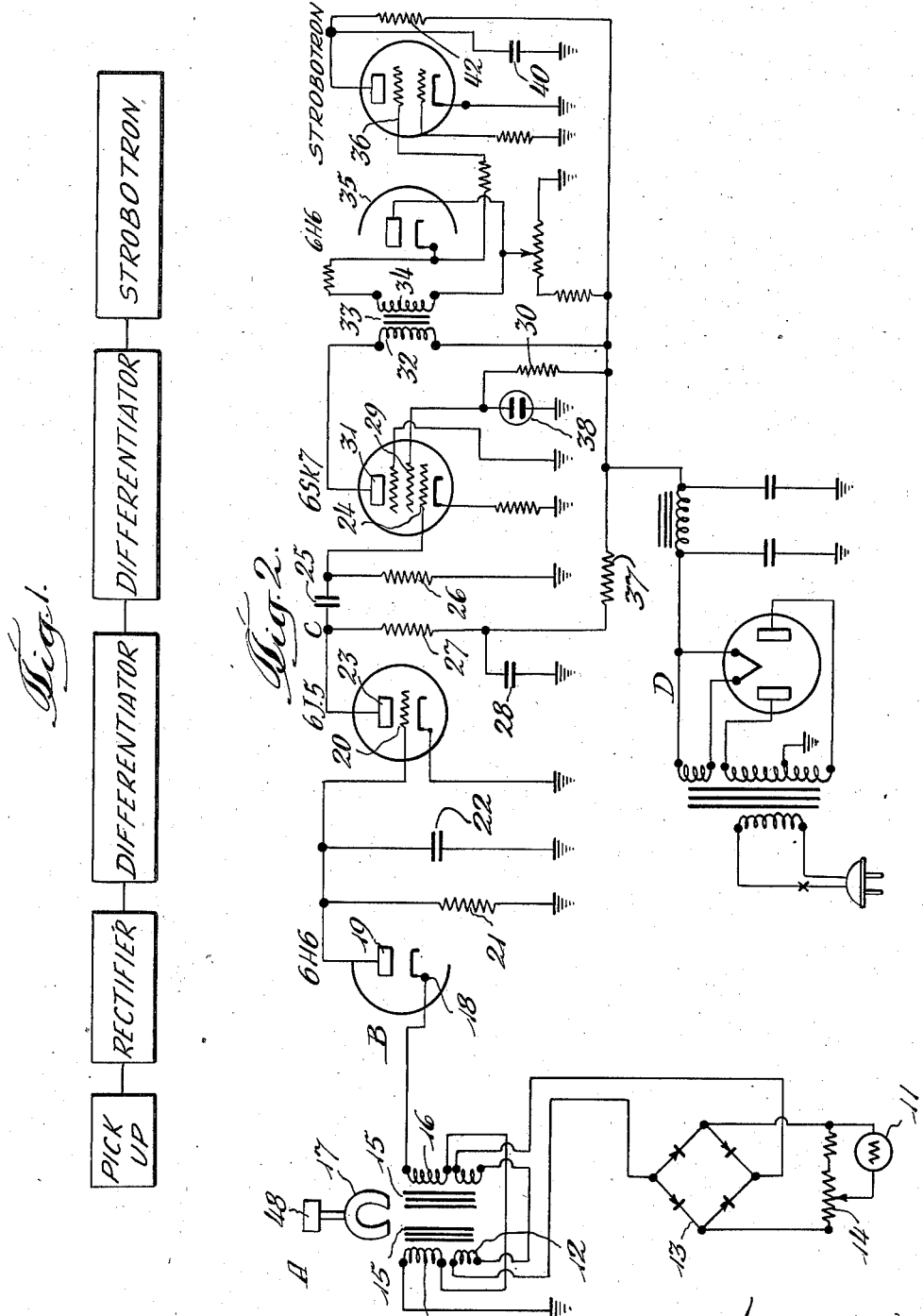

Sept. 21, 1948.  C. M. HATHAWAY  2,449,651
ELECTRONIC CIRCUIT FOR TRIGGERING
STROBOSCOPIC DEVICES
Original Filed June 11, 1942  2 Sheets-Sheet 2

Inventor:
Claude M. Hathaway
By Williams, Bradbury & Hinkle
Attorneys

Patented Sept. 21, 1948

2,449,651

UNITED STATES PATENT OFFICE 2,449,651

ELECTRONIC CIRCUIT FOR TRIGGERING STROBOSCOPIC DEVICES

Claude M. Hathaway, Denver, Colo., assignor to Marcellus S. Merrill, Denver, Colo.

Continuation of application Serial No. 446,611, June 11, 1942. This application March 11, 1946, Serial No. 653,511

8 Claims. (Cl. 315—194)

This invention relates to a new and improved electronic circuit, and more particularly to a circuit adapted to modify a sinusoidal wave form so as to provide a single sharply peaked impulse at a definite point in each cycle.

This application is a continuation of my application Serial Number 446,611, filed June 11, 1942, now abandoned.

While circuits of this character are useful for a number of purposes, such circuit is especially desirable for use in connection with a wheel balancing apparatus and method such as disclosed in my application Serial Number 350,366, filed July 27, 1940, jointly with Marcellus S. Merrill, which issued August 21, 1945, as Patent No. 2,383,-405, and was copending with my application Serial Number 446,611.

Apparatus for balancing wheels or other rotating bodies comprises essentially means for locating the unbalanced weight and determining its amount. This involves, as further steps, the check of the rotating body after the application of corrective measures, such as the addition of localized weight, to determine whether a condition of balance has been reached.

This apparatus described in the previous application comprises means adapted to engage the support for the rotating body and to generate an alternating current having a definite phase relationship with the vibration of the support due to the unbalance of the rotating body. The current amplitude is also approximately proportional to the amount of unbalance. The apparatus also includes an electronic circuit which "modifies" the alternating current wave form to produce a single sharp peak occurring once in each cycle, this peak being utilized to fire a strobotron tube. Due to the known and predetermined relationship of the firing instant of the tube, with the direction of vibration of the unbalanced body at that instant, the locus of the unbalanced weight is determined by visual observation. The approximate amount of the unbalanced weight is determined by a measurement of the current generated by the vibration.

The present invention relates to an electronic circuit for "modifying" a sinusoidal wave form to provide a single peak during each cycle, this peak being utilized to fire a strobotron tube.

It is an object of the present invention to provide a new and improved electronic circuit for modifying the wave form of an alternating current.

It is another object to provide an output wave form having a single sharp peak for each cycle of the input current.

It is also an object to provide a circuit in which the output peak has a definite and substantially fixed relationship to the phase of the input sinusoidal wave form.

It is an additional object to provide a circuit which requires but few parts, which operates upon a relatively small input current, and which requires only a small amount of power.

It is a further object to provide a circuit which requires apparatus simple in design and operation and adapted for commercial production and use.

Other and further objects will appear as the description proceeds.

I have shown the circuit and the wave forms produced thereby somewhat diagrammatically in the drawings, in which Figure 1 is a block diagram of the circuit;

Figure 2 is a schematic circuit diagram;

Figure 3:
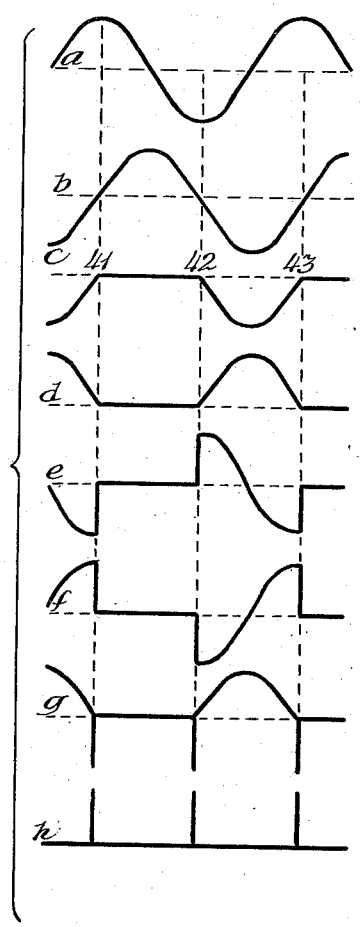
Figure 3 shows the theoretical wave forms at different points in the circuit.

As shown in Figure 1, the circuit comprises a pick-up for the current generated by the vibration due to unbalanced weight, the pickup feeding into a rectifier which blocks half the cycle; and the passed current is then modified by successive differentiator circuits to give the desired sharply defined and definitely located peak which is desired for firing the strobotron tube.

A typical circuit is shown schematically in Figure 2. The meter 11 is shown connected to pickup coil 12 through rectifier network 13, the meter being shunted by the variable resistance 14. This meter circuit has its pickup coil adjacent the current generating unit. The generating unit A is shown as comprising a pair of iron cores 15, about which are wound the pickup coils 12 of the meter circuit and also the pickup coil 16 of the strobotron circuit. A permanent magnet 17 is movably supported adjacent the cores 15 and is connected to a contact member 48 which is adapted to be maintained in contact with a vibrating member such as a wheel axle or brake backing plate. Vibration transmitted from the unbalanced rotating member serves to move the magnet 17 toward and away from the cores 15. The relative movement between the parts generates a current having a cycle dependent upon the periodicity of vibration and an amplitude related to the amplitude of vibration. The meter circuit is independent of the strobotron firing circuit, except that both circuits have pickup coils coupled inductively to the same current generating device.

The mechanical details of construction of the pickup member form no part of the present invention and will not be further described herein. A suitable construction is disclosed in my prior joint application referred to above.

The strobotron firing circuit comprises the pickup coil 16, which supplies a voltage to the rectifier B. The specific form of rectifier shown comprises half of a double diode tube, such as a 6H6, the connection being to the cathode 18. The rectifier plate 19 feeds the half cycle passed through the rectifier to the grid 20 of a triode such as a 6J5. The grid circuit includes the grid resistor 21 and the grid capacitor 22 constituting means for modifying the wave form due to the capacitor 22 charging on the wave front and discharging exponentially through the resistor 21.

The plate 23 of the triode is connected by the first differentiator circuit C to the control grid 24 of a tube such as a 6SK7, as shown. The differentiator circuit C comprises the capacitor 25 and the resistance 26. The plate circuit of the triode plate 23 includes the resistance 27 and condenser 28. The triode plate is connected through the voltage dropping resistor 37 to the positive side of the power supply D, which is shown as of conventional form with full wave rectification.

The 6SK7 tube has its screen grid 29 connected through a voltage dropping resistor 30 to the power supply D. The screen grid 29 is also grounded through the voltage regulator tube 38.

The plate 31 of this tube is connected to the primary 32 of the coupling transformer 33. The plate resistance of the tube and the inductance of the transformer primary constitute a second differentiator circuit.

The secondary 34 of the transformer 33 is connected across the rectifier 35, which is shown as the second half of the 6H6 tube used as the original input rectifier, and which eliminates unwanted reverse peaks of the trigger voltage. The cathode of this rectifier unit is connected to the control grid 36 of the strobotron tube, the voltage supplied serving to trigger the strobotron. Associated with the strobotron is a capacitor 40 adapted to discharge through the strobotron when the latter is rendered conductive and connected across its plate and cathode and a resistor 42 through which the capacitor is charged.

Figure 4:
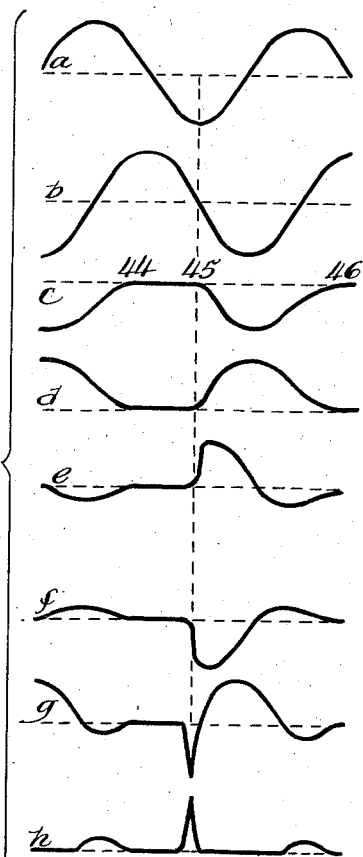
Figure 4 is similar to Figure 3, but shows the actual wave forms produced, as observed upon an oscilloscope.

The theoretical wave forms are shown in Figure 3 and the actual wave forms produced in the circuit are shown in Figure 4.

Referring first to Figure 3, the voltage generated by the pickup is assumed to be sinusoidal in form, as shown in a. The voltage, in order that the final trigger peak may occur in the desired phase relation to the vibration force, should be another sinusoid displaced 90 degrees in phase from the input wave as shown in Figure 3b, which shift can be accomplished by an integrating circuit or by the pickup and input circuit, as explained hereafter. This wave is applied to the rectifier B, shown in Figure 2, and since this rectifier cannot conduct in the forward direction, the positive half-cycles will be eliminated, and the voltage applied to the grid of the triode 6J5 will theoretically be as shown in C of Figure 3.

The voltage which appears across the resistor 27 in the plate circuit of the tube will take the wave form shown in d of Figure 3, being the reverse of that shown in Figure 3. The resistor 26 and the capacitor 25 constitute a differentiating circuit, so that the voltage applied to the control grid 24 of the 6SK7 tube will be proportional to the slope of d and is shown at e of Figure 3. The theoretical current in the plate circuit of the 6SK7 tube is the negative of this, and is in the form shown at f of Figure 3. The plate resistance of this 6SK7 tube, together with the inductance of the primary winding 32 of the transformer 33, constitutes a second differentiator. The voltage across the transformer primary is therefore proportional to the slope f of Figure 3, and theoretically takes the form shown at g of Figure 3. The wave form of h of Figure 3 is reverse of that shown at g of Figure 3 and appears theoretically at the control grid of the strobotron tube, after the diode limiting action of the rectifier section 35. It is apparent that if the theoretical wave forms of Figure 3 actually appeared in the circuit, the strobotron would fire twice in each cycle, and therefore the operation would be unsatisfactory.

Certain practical limitations, however, intervene to modify the actual wave form and remedy this defect. Fortunately, these practical modifications result in a wave form having a single sharp peak in each cycle, and thus provide a wave form suitable for actual operation of a strobotron.

In Figure 4 the actual wave forms in the circuit are shown, these wave forms being observed in an oscilloscope connected to the circuit at the various points. The actual sinusoidal wave of Figure 4a is similar to the theoretical wave, and the same is true of the phase shifted wave of Figure 4b. Theoretically it would be necessary to provide an integrating circuit to cause this phase shift, but it has been found in practice that the inductive and capacitive reactance of the pickup coils and the distributed self capacity of the coils and associated circuit are such as to inherently provide the desired integration and phase shift. When we reach the wave form of Figure 4c, however, which is that in the output circuit of the rectifier B, the theoretical curve suffers certain distortions. The discontinuities at the points 41, 42 and 43 of Figure 3c are sharp, but in the actual circuit, as shown at 44, 45 and 46, these are slightly rounded.

In order to obtain the theoretical sharp corners, the rectifier B would have to change from infinite conductance for the smallest positive voltage to infinite resistance for the smallest negative voltage. The corners on the rising voltage are similarly rounded as shown at 46. This is due to the finite time constant of the modifying means including the plate resistor 21 and the grid capacitance 22, which latter may be increased by the addition of an extra capacitor to increase this effect. The wave form of Figure 4d is the reverse of Figure 4c. The remaining wave forms, Figure 4e, f, g and h, are obtained as before, and it is seen that the actual wave form has one sharp positive peak, occurring at a definite time and in fixed relationship to the phase of the input sinusoidal wave. The voltage of the sharp positive peak is sufficient to fire the strobotron.

It will be noted that the circuit is a wave form shaping circuit and not an amplifying circuit. The original voltage generated by vibration of the pickup is small, especially if the rotating body is only slightly out of balance. It is necessary to amplify this voltage to provide for voltage sufficient to counterbalance the losses in the differentiator circuits. It is also necessary to provide the final wave form at a voltage such that the sharp peak will be adequate to trigger the strobotron.

While in the drawings I have shown certain embodiments of my invention, it will be understood that it may be varied to meet differing conditions and requirements, and I contemplate such modifications as come within the spirit and scope of the appended claims.

What I claim is:

1. An electronic circuit for generating sharply defined impulses from sine wave currents, including in combination, a rectifier for rectifying the sine wave currents and having an output circuit, an amplifier including a thermionic tube having a grid coupled to the output circuit of the rectifier, means included in said output circuit for modifying the wave shape of the rectified currents, a second amplifier including another thermionic tube having a plate, coupling means between said tubes including means for differentiating the rectified and modified currents to produce a wave shape having a single peak per cycle in definite phase relation with the sine wave currents, a coupling transformer having primary and secondary windings, said second thermionic tube having a plate circuit including the primary winding of said coupling transformer, said plate circuit forming another differentiating circuit for more sharply peaking said wave shape, a second rectifier connected in parallel with said secondary winding of said coupling transformer and having an output circuit, and an output circuit electrically coupled to the output circuit of said second rectifier.

2. In an electronic circuit for a stroboscopic device, the combination with electromagnetic pickup means for generating an alternating current of substantially sinusoidal wave form, of an input circuit connecting with the said electromagnetic pickup means for displacing the phase angle of said wave, a rectifier for rectifying the phase shifted wave, an amplifier including a thermionic tube having a grid coupled to the output circuit of the rectifier, means included in said output circuit for modifying the wave shape of the rectified currents, a second amplifier including another thermionic tube, coupling means between said tubes including means for differentiating the rectified and modified currents to produce a wave shape having a single peak per cycle in definite phase relation with the phase shifted wave, a coupling transformer having primary and secondary windings, said second thermionic tube having a plate circuit including the primary winding of said coupling transformer, said plate circuit forming another differentiating circuit, a second rectifier connected in parallel with the secondary winding of said coupling transformer, and means for electrically coupling a stroboscopic device to said second rectifier.

3. In an electronic circuit for triggering a stroboscopic device, the combination with electromagnetic pickup means for generating an alternating current of substantially sinusoidal wave form, of an input circuit connecting with said electromagnetic pickup means for phase shifting said wave substantially 90 degrees, a rectifier for rectifying the phase shifted wave, an amplifier including a thermionic tube having a grid coupled with the output circuit of the rectifier, means included in said output circuit for modifying the shape of the rectified wave, a second amplifier including another thermionic tube, coupling means between said tubes including means for differentiating the rectified and modified currents to produce a wave shape having a single peak per cycle in definite phase relation with the phase shifted wave, a coupling transformer having primary and secondary windings, said second thermionic tube having a plate circuit including the primary winding of said coupling transformer, said plate circuit forming another differentiating circuit, and an output circuit electrically coupled with the secondary winding of said coupling transformer for deriving therefrom currents having voltage impulses capable of triggering the stroboscopic device.

4. In an electronic circuit for triggering a stroboscopic device, an input circuit for supplying sine wave currents, a rectifier for rectifying the sine wave currents, alternate amplifying and differentiating stages for amplifying and differentiating said rectified currents, each amplifying stage including a thermionic tube, the first tube including a control grid and the last tube a plate, means coupling said grid of the first tube with the output of the rectifier, a coupling transformer having a primary winding in the plate circuit of the last tube and a secondary winding, whereby a high voltage impulse is produced for each cycle of the input sine wave, a second rectifier having an output circuit and connected in parallel with the secondary winding of said coupling transformer, and an output circuit coupled to the output circuit of said second rectifier to derive currents therefrom having voltage impulses capable of triggering the stroboscopic device.

5. In an electronic circuit for triggering a stroboscopic device, in combination, an input circuit for supplying sine wave currents, a rectifier for rectifying said sine wave currents, amplifying stages each including a thermionic tube, the tube of the first stage including a grid coupled with the output of the rectifier and the tube of the last stage including a plate circuit, a coupling transformer having a secondary winding and a primary winding in the plate circuit of the tube of the last stage, said plate circuit providing differentiating means for wave shaping the rectified and amplified currents to produce a shape having a single peak per cycle, whereby a high voltage impulse is produced across the primary winding for each cycle and which has a definite phase relation with said input sine wave, and an output circuit having electrical connection with the secondary winding of said coupling transformer to derive currents therefrom having voltage impulses capable of triggering the stroboscopic device.

6. An electronic circuit as defined by claim 5, additionally including a second rectifier located in the output circuit and connected in parallel with the secondary winding of the coupling transformer, said second rectifier serving to substantially eliminate unwanted reverse peaks in the shaped wave.

7. In an electronic circuit for triggering a stroboscopic device in definite phase relation with alternating current of substantially sinusoidal wave form, the combination including, rectifying means supplied with the alternating current for providing current of one polarity, and means coupled to said rectifying means for supplying triggering impulses to the stroboscopic device for each cycle of the input wave and in definite phase relation thereto, said last mentioned means including a first amplifying and differentiating stage comprising a thermionic tube having an input circuit coupled to said rectifying means and differentiating means coupled to said tube, and a second amplifying and differentiating stage including a thermionic tube having an input circuit coupled to the first mentioned differentiating means and a transformer coupled to the output circuit of said last mentioned tube, and means for coupling the transformer to the stroboscopic device.

8. In an electronic circuit for triggering a stroboscopic device in definite phase relation with alternating current of substantially sinusoidal wave form, the combination including, rectifying means supplied with the alternating current for providing current of one polarity, and means coupled to said rectifying means for supplying triggering impulses to the stroboscopic device for each cycle of the input wave and in definite phase relation thereto, said last mentioned means including a first amplifying and differentiating stage comprising a thermionic tube having an input circuit coupled to said rectifying means and differentiating means coupled to said tube, and a second amplifying and differentiating stage including a thermionic tube having an input circuit coupled to the first mentioned differentiating means and a transformer coupled to its output circuit, and means including rectifying means eliminating undesired voltage peaks of one polarity for coupling the transformer to the stroboscopic device.

CLAUDE M. HATHAWAY.

REFERENCES CITED

The following references are of record in the file of this patent:

UNITED STATES PATENTS

| Number | Name | Date |
|---|---|---|
| 2,188,611 | Norton | Jan. 30, 1940 |
| 2,341,541 | Grier | Feb. 15, 1944 |
| 2,385,397 | Blackburn | Sept. 25, 1945 |